United States Patent
Kao et al.

(10) Patent No.: US 9,269,148 B2
(45) Date of Patent: Feb. 23, 2016

(54) DISPLACEMENT DETECTION DEVICE

(71) Applicant: PixArt Imaging Inc., Hsin-Chu County (TW)

(72) Inventors: Ming-Tsan Kao, Hsin-Chu (TW); Ren-Hau Gu, Hsin-Chu (TW); Yu-Hao Huang, Hsin-Chu (TW)

(73) Assignee: PIXART IMAGING INC., Hsin-Chu County (TW)

( * ) Notice: Subject to any disclaimer, the term of this patent is extended or adjusted under 35 U.S.C. 154(b) by 16 days.

(21) Appl. No.: 13/858,131

(22) Filed: Apr. 8, 2013

(65) Prior Publication Data

US 2013/0329962 A1 Dec. 12, 2013

(30) Foreign Application Priority Data

Jun. 11, 2012 (TW) .............................. 101120893 A

(51) Int. Cl.
  *G06K 9/00* (2006.01)
  *G06T 7/00* (2006.01)
  *G06T 7/20* (2006.01)
  *G06F 3/03* (2006.01)
  *G06F 3/038* (2013.01)
  *G06F 3/0354* (2013.01)

(52) U.S. Cl.
  CPC .............. *G06T 7/004* (2013.01); *G06F 3/0304* (2013.01); *G06F 3/0383* (2013.01); *G06F 3/03543* (2013.01); *G06T 7/2033* (2013.01); *G06T 2207/10016* (2013.01)

(58) Field of Classification Search
  None
  See application file for complete search history.

(56) References Cited

U.S. PATENT DOCUMENTS

| | | | |
|---|---|---|---|
| 8,232,966 B2* | 7/2012 | Cheah | G06F 3/03543 178/19.05 |
| 8,368,381 B1* | 2/2013 | Becvar | G06F 3/0312 324/76.11 |
| 2003/0058218 A1* | 3/2003 | Crane | G06F 3/0317 345/158 |
| 2005/0072905 A1* | 4/2005 | Park | G06F 3/0317 250/208.1 |
| 2005/0116928 A1* | 6/2005 | Bohn | G06F 3/03543 345/157 |
| 2007/0029464 A1* | 2/2007 | Chiu | G06F 3/0317 250/208.1 |
| 2009/0160774 A1* | 6/2009 | Lee | G06F 3/03543 345/166 |
| 2010/0103107 A1* | 4/2010 | Chao | G06F 3/0317 345/166 |
| 2010/0172545 A1* | 7/2010 | Lim | G01S 17/023 382/106 |
| 2011/0150363 A1* | 6/2011 | Chen | G06F 3/0304 382/291 |
| 2012/0092258 A1* | 4/2012 | Lutian | G06F 3/03543 345/166 |
| 2012/0200861 A1* | 8/2012 | Chen | G01B 11/002 356/614 |
| 2014/0064609 A1* | 3/2014 | Petre | G06K 9/6232 382/159 |

FOREIGN PATENT DOCUMENTS

| | | | | |
|---|---|---|---|---|
| EP | 0957448 A2 * | 5/1999 | | G06K 17/00 |
| EP | 0957448 A2 * | 11/1999 | | G06F 1/1626 |
| TW | 201122920 A | 7/2011 | | |
| TW | 201137792 A | 11/2011 | | |

* cited by examiner

Primary Examiner — Matthew Bella
Assistant Examiner — Soo Shin
(74) Attorney, Agent, or Firm — Hauptman Ham, LLP

(57) ABSTRACT

A displacement detection device includes a light source, an image sensor and a processing unit. The light source is configured to illuminate a work surface. The image sensor is configured to capture reflected light from the work surface and to output an image frame. The processing unit is configured to select a window of interest in the image frame having a maximum image feature and to calculate a displacement of the displacement detection device according to the window of interest.

20 Claims, 4 Drawing Sheets

DISPLACEMENT DETECTION DEVICE

CROSS REFERENCE TO RELATED APPLICATION

This application claims the priority benefit of Taiwan Patent Application Serial Number 101120893, filed on Jun. 11, 2012, the full disclosure of which is incorporated herein by reference.

BACKGROUND

1. Field of the Disclosure

This disclosure generally relates to an interactive device and, more particularly, to a displacement detection device that may dynamically select pixels of interest in the image frame to accordingly calculate the displacement.

2. Description of the Related Art

The conventional optical mouse generally includes a light source, an image sensor and a processing unit and is configured to be operated by a user on a work surface. The light source is configured to illuminate the work surface. The image sensor is configured to receive reflected light from the work surface and to output image frames. The processing unit is configured to calculate a displacement of the optical mouse with respect to the work surface according to the image frames outputted by the image sensor, e.g. calculating the displacement according to the correlation between the image frames.

In the conventional optical mouse, the image sensor is configured to detect reflected light from the work surface. Therefore, when the image quality of the image frames captured by the image sensor is poor, it may not be able to calculate the displacement correctly.

For example referring to FIG. 1, an optical mouse generally includes a light source 81 configured to illuminate a work surface 9 through a lens 82, and the reflected light from the work surface 9 is received by an image sensor 84 through another lens 83. In assembling the optical mouse, the image sensor 84 may not be exactly disposed at an expected position. For example, if the image sensor is disposed at the position 84' rather than at the position 84, the image quality of the image frames formed by capturing the reflected light of the work surface 9 by the image sensor may be poor and the poor images may lead to errors in calculation.

In addition, even though the image sensor 84 is exactly disposed at the expected position in assembling, the imaging may still have a position deviation when the optical mouse is operated on different work surfaces. For example referring to FIG. 2A, it shows a schematic diagram of the optical mouse operated on a surface of a glass in which reflected light of the work surface 9 still can be received by the image sensor 84. However, when the optical mouse is operated on a surface of another glass having a larger thickness as shown in FIG. 2B, the image sensor 84 may not able to receive the reflected light of the work surface 9 correctly such that the image quality is decreased and errors may occur in calculation.

Accordingly, the present disclosure further provides a displacement detection device that can be operated on different work surfaces and can effectively overcome the low image quality caused by the assembling error.

SUMMARY

The present disclosure provides a displacement detection device that may overcome the problem of low calculation accuracy caused by the assembly error.

The present disclosure further provides a displacement detection device that may adjust the window of interest in the image frame according to different work surfaces so as to improve the calculation accuracy.

The present disclosure provides a displacement detection device including a light source, an image sensor and a processing unit. The light source is configured to illuminate a work surface toward a projection direction. The image sensor is configured to capture reflected light from the work surface and to successively output image frames. The processing unit is configured to respectively select at least one window of interest in the image frames and to calculate a displacement of the displacement detection device according to the window of interest in two of the image frames.

The present disclosure further provides a displacement detection device including a light source, an image sensing matrix, an adding unit, an analog-to-digital unit and a processing unit. The light source is configured to illuminate a work surface toward a projection direction. The image sensing matrix is configured to capture reflected light from the work surface and to output a first analog image. The adding unit is configured to attenuate the first analog image with a DC value and to output a second analog image. The analog-to-digital unit is configured to amplify the second analog image and to output a digital image frame. The processing unit is configured to select at least one window of interest in the digital image frame and to calculate a displacement of the displacement detection device according to the window of interest selected. This aspect is configured to improve the image feature when the image feature of the image frame is not apparent enough.

The present disclosure further provides a displacement detection device including a light source, an image sensor and a processing unit. The light source is configured to illuminate a work surface toward a projection direction. The image sensor is configured to capture reflected light from the work surface and to output an image frame. The processing unit is configured to select a window of interest in the image frame having a maximum image feature and to calculate a displacement of the displacement detection device according to the window of interest selected.

In the displacement detection device of the present disclosure, by using an image sensing matrix having a larger pixel area (e.g. 32×128) the reflected light from the work surface can be received more, wherein the image sensing matrix preferably has a rectangle shape and a length direction of the image sensing matrix preferably extends along a direction of a horizontal component of the projection direction.

In the present disclosure, by selecting a single window of interest having a maximum image feature or at least one window of interest in the image frames captured by the image sensor it is able to correctly calculate the displacement according to pixel ranges having apparent image features, wherein said maximum image feature is referred to the pixel range having a largest average image feature within all pixel ranges having a image feature larger than a predetermined value, e.g. the maximum image feature may be the maximum average image quality or the maximum average image intensity.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1:
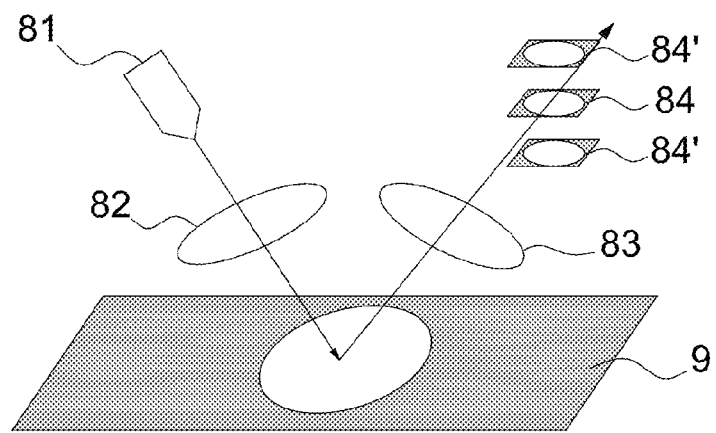
FIG. 1 shows a schematic diagram of the conventional optical mouse in which the image sensor has the assembly deviation.
Figure 2A:
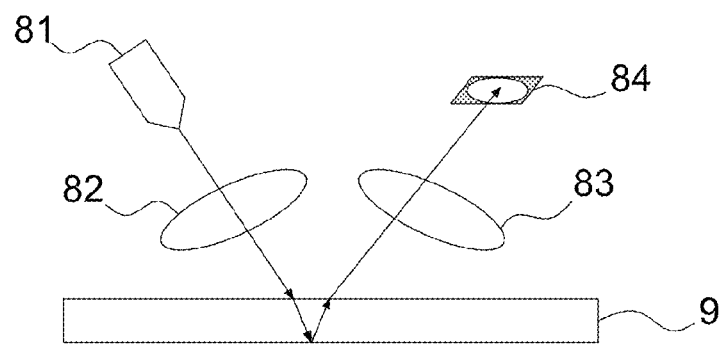
FIGS. 2A-2B show schematic diagrams of the conventional optical mouse operated on the surface of glasses having different thicknesses.
Figure 2B:
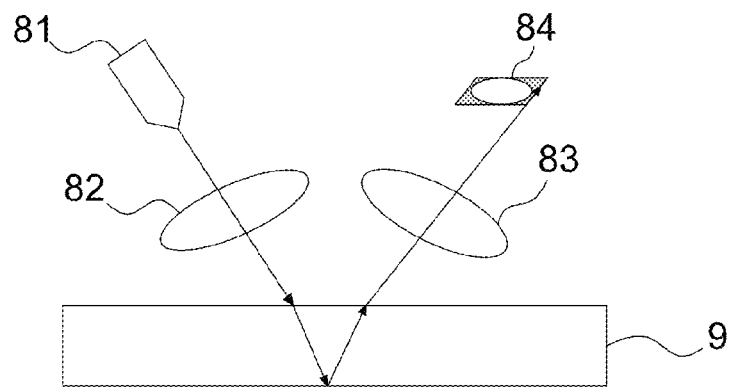
Figure 3:
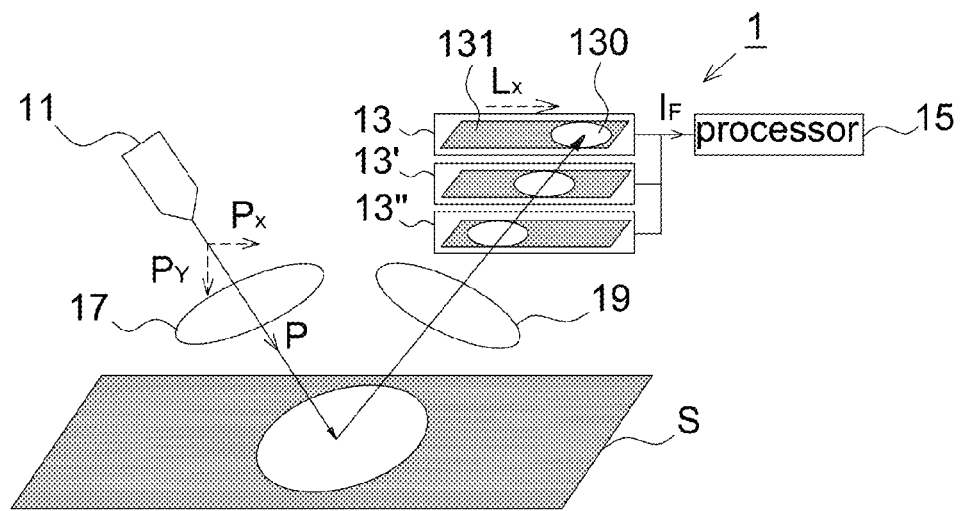
FIG. 3 shows a schematic diagram of the displacement detection device according to an embodiment of the present disclosure in which the image sensor has the assembly deviation.

Referring to FIG. 3, it shows a schematic diagram of the displacement detection device 1 according to an embodiment of the present disclosure. The displacement detection device 1 includes a light source 11, an image sensor 13 and a processing unit 15. In some embodiments the displacement detection device 1 may further include an optical component 17 (e.g. a lens) configured to adjust an illumination range of the light source 11 and an optical component 19 (e.g. a lens) configured to improve the sensing efficiency of the image sensor 13. The displacement detection device 1 is configured to detect a displacement with respect to a work surface S and to output the displacement to an electronic device (not shown) for relative control. It should be mentioned that the displacement detection device 1 shown in FIG. 3 actually includes only one image sensor 13, 13' or 13" and three image sensors are shown together only for illustrating the assembly deviation. That is, the image sensor may be disposed at one of the three positions 13, 13' or 13" and FIG. 3 does not mean that three image sensors are included in the displacement detection device 1.

The light source 11 may be a light emitting diode or a laser diode and is configured to emit infrared light or invisible light for providing the light needed by the image sensor 13 in capturing images. The light source 11 illuminates the work surface S in a projection direction P, wherein the projection direction P includes a horizontal component $P_X$ parallel to the work surface S and a vertical component $P_Y$ perpendicular to the work surface S.

The image sensor 13 is preferably a CMOS image sensor or other active image sensors and is configured to capture reflected light from the work surface S to successively output image frames $I_F$, wherein the image frames $I_F$ are digital image frames. The image sensor 13 preferably includes an image sensing matrix 131 having a rectangle shape. A length direction $L_X$ of the image sensing matrix 131 substantially extends along a direction of the horizontal component $P_X$ of the projection direction P and the image sensing matrix 131 may have a pixel size of 32×128, but not limited thereto. In this manner, no matter which of the positions 13, 13' and 13" shown in the figure that the image sensor 13 is disposed in assembling, the image sensor 13 is able to detect the reflected light from the work surface S. It is appreciated that a position deviation between the positions 13, 13' or 13" is actually very small and the scale is enlarged in FIG. 3 for illustration purpose.

The processing unit 15 may be a digital signal processor (DSP) and is configured to select at least one window of interest 130 in the image frames $I_F$ outputted by the image sensor 13 and to calculate a displacement of the displacement detection device 1 according to the selected window of interest 130, e.g. calculating the displacement according to the correlation between the windows of interest 130 of two image frames $I_F$. In one embodiment, the at least one window of interest 130 may be defined as one or a plurality of pixel ranges in the image frames $I_F$ having an image feature exceeding a predetermined value, wherein the image feature may be image quality or image intensity. In other words, the processing unit 15 of the displacement detection device 1 of the present disclosure does not use the whole image frame $I_F$ outputted by the image sensor 13 to calculate the displacement but dynamically uses partial pixel ranges having apparent image features for calculation.

Figure 4:
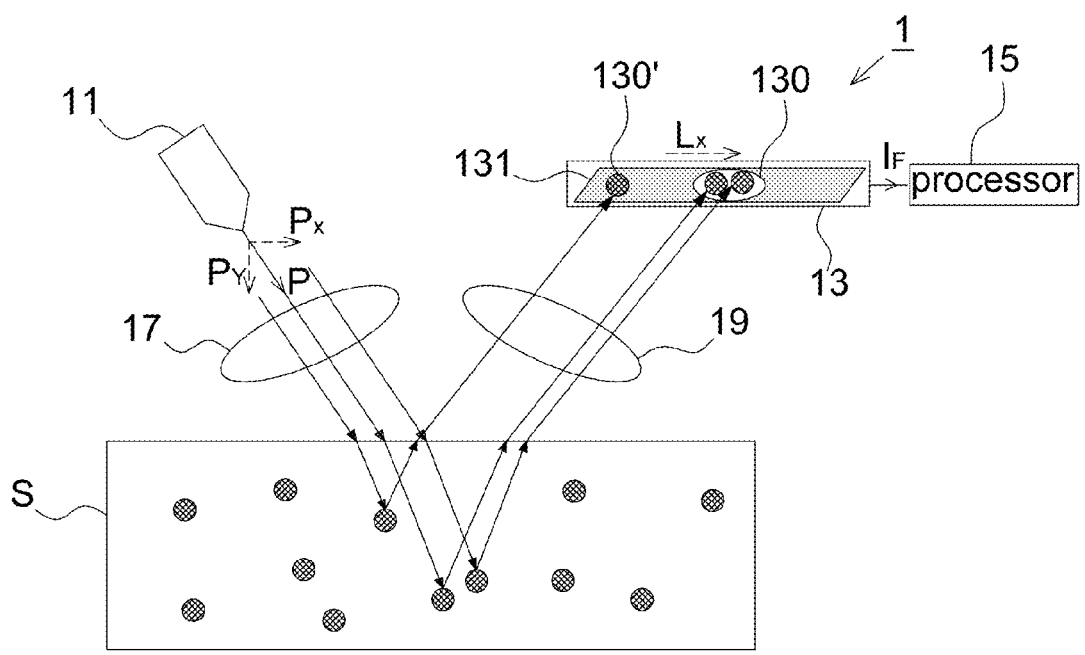
FIG. 4 shows an operational schematic diagram of the displacement detection device according to the embodiment of the present disclosure.

Referring to FIG. 4, when a plurality of windows of interest in the image frames $I_F$ are identified, e.g. the windows of interest 130 and 130' herein, the processing unit 15 selects one of the windows of interest (e.g. 130) having a maximum image feature or a maximum area in the image frames $I_F$ outputted by the image sensor 13 and calculates the displacement of the displacement detection device 1 according to the selected window of interest 130, and the window of interest 130' will be ignored herein. In other embodiments, the processing unit 15 may calculate the displacement respectively according to different windows of interest, e.g. calculating a first displacement according to the window of interest 130 and calculating a second displacement according to the window of interest 130' and then comparing a consistency between the displacements calculated according to different windows of interest. In this manner, it is able to double check the accuracy of the calculated displacement when the image feature is not apparent enough (e.g. operating on a work surface S having a low reflection coefficient). Said the maximum image feature may be referred to a pixel range having the largest average image feature in all pixel ranges whose image feature are larger than a predetermined value, e.g. having the maximum value of an average image quality or an average image intensity.

Figure 5A:
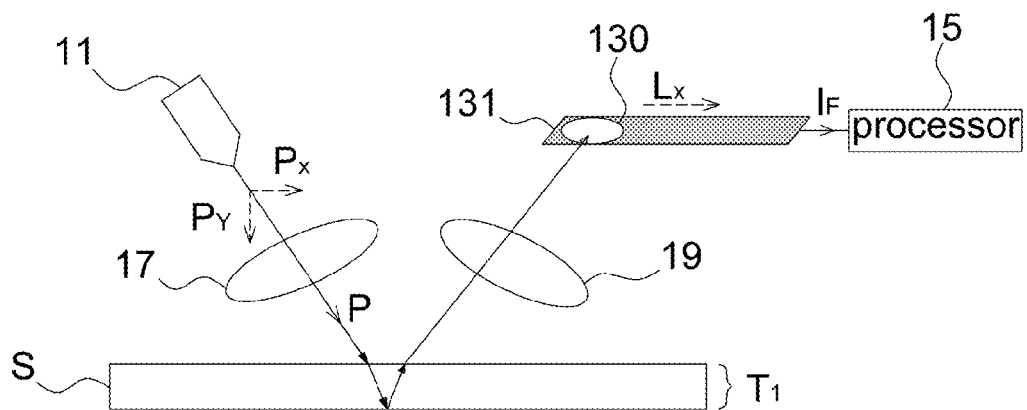
FIGS. 5A-5B show operational schematic diagrams of the displacement detection device of the present disclosure operated on the surface of glasses having different thicknesses.
Figure 5B:
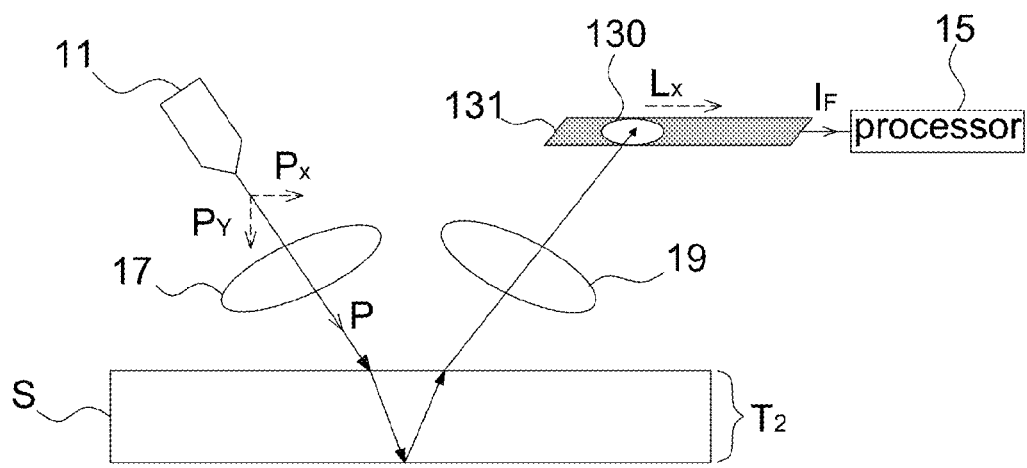

The displacement detection device 1 of the present disclosure not only may tolerate the assembly error but also may adjust the window of interest 130 of the image sensor 13 according to different work surfaces S. For example referring to FIGS. 5A and 5B, they show operational schematic diagrams of the displacement detection device 1 operated on a surface of glasses having different thicknesses. When the displacement detection device 1 is operated on the work surface S having a first thickness $T_1$, the window of interest 130 may be selected at the leftmost position of the image sensing matrix 130 as shown in FIG. 5A, and when the displacement detection device 1 is operated on the work surface S having a second thickness $T_2$, the window of interest 130 may shift toward right in the image sensing matrix 130 as shown in FIG. 5B. As mentioned above, the processing unit 15 may identify one or a plurality of pixel ranges in the image frame $I_F$ having an image feature exceeding a predetermined value as the window of interest 130 to accordingly calculate the displacement.

In addition, in order to improve the accuracy of selecting the window of interest 130, when the image feature of each of the image frames $I_F$ is smaller than the predetermined value or before each of the image frames $I_F$ is outputted, the image sensor 13 may further perform the following steps: attenuating an analog image with a DC (direct current) value; amplifying the analog image attenuated by the DC value; and then digitizing the attenuated and amplified analog image to output the digital image frame $I_F$.

Figure 6:
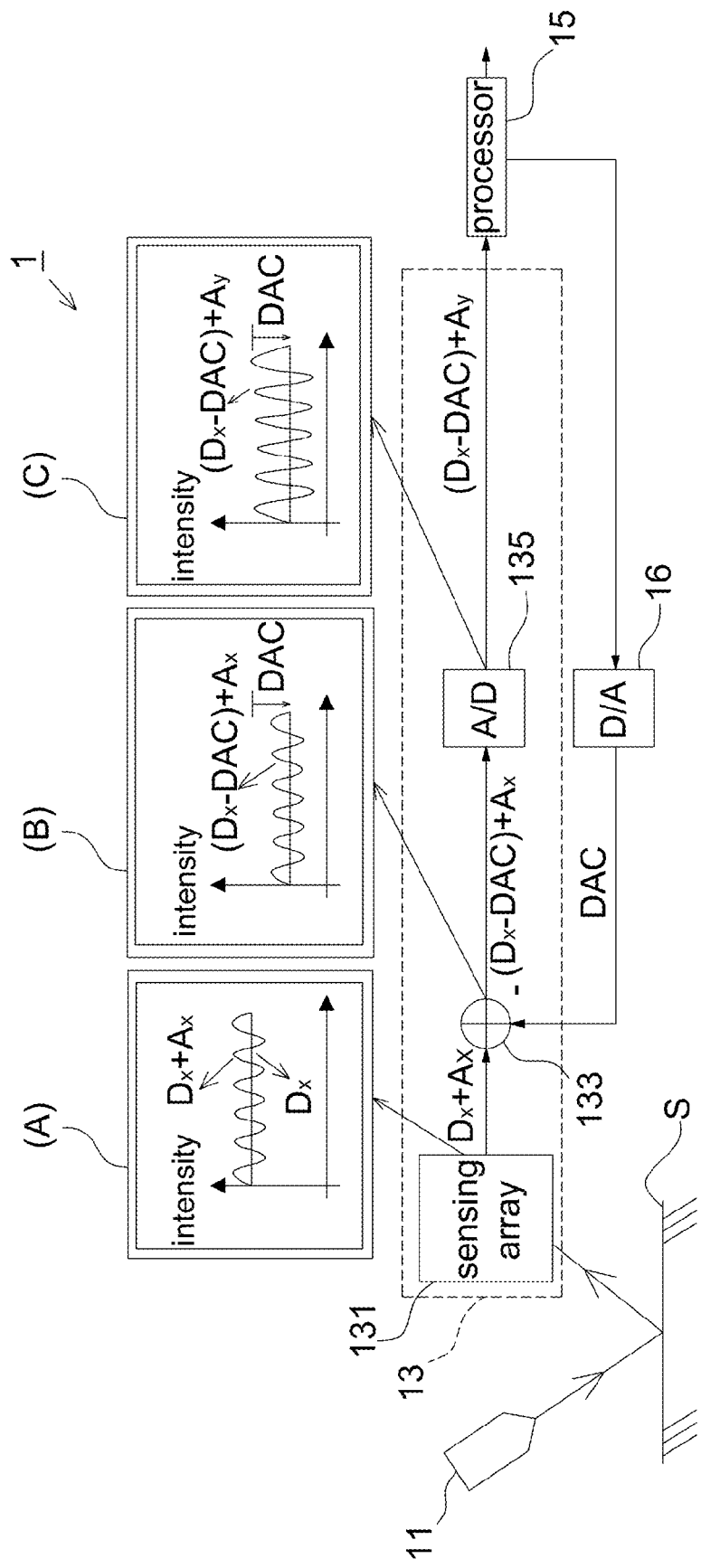
FIG. 6 shows a schematic block diagram of the displacement detection device according to an embodiment of the present disclosure.

Referring to FIG. 6, it shows a schematic block diagram of the displacement detection device 1 according to an embodiment of the present disclosure, wherein the image sensor 13 further includes an image sensing matrix 131, an adding unit 133 and an analog-to-digital unit 135. In this embodiment, the light source 11 also illuminates the work surface S toward the projection direction P. The image sensing matrix 131 is configured to capture reflected light from the work surface S and to output a first analog image. The first analog image may be a two-dimensional analog image, wherein FIG. 6(A) shows the intensity (Dx+Ax) of one row of pixels of the first analog image and Dx indicates an average intensity and Ax indicates the intensity feature variation. The adding unit 133 (may also be implemented by a subtractor) attenuates the first analog image by a DC value DAC and to output a second analog image, wherein FIG. 6(B) shows the intensity (Dx−DAC)+Ax of one row of pixels of the second analog image and the purpose of attenuating the intensity (Dx+Ax) by the DC value DAC is to avoid the intensity to reach the maximum limit of intensity range in the following processes including amplifying and digitizing. The analog-to-digital unit 135 amplifies the second analog image and converts the amplified second analog image to a digital image frame to be outputted to the processing unit 15, wherein FIG. 6(C) shows the intensity (Dx−DAC)+Ay of one row of pixels of the digital image frame and Ay indicates the intensity feature variation. Apparently, the peak to peak value of the intensity feature is effectively increased. In this embodiment, the analog-to-digital unit 135 may be a linear or a nonlinear analog-to-digital converter, or an amplifier may further be included in the analog-to-digital unit 135 for amplifying the second analog image at first and then the analog-digital conversion is performed. In this manner, it is able to improve the image feature of the digital image frame by processing the first analog image captured by the image sensing matrix 131 with the adding unit 133 and the analog-to-digital unit 135 thereby increasing the accuracy of selecting the window of interest.

In addition, in this embodiment the DC value DAC may be an average intensity or an intensity offset of the second analog image and determined by the processing unit 15 according to the digital image frame. The average intensity or the intensity offset may be converted by a digital-to-analog unit 16 to an analog signal to be inputted into the adding unit 133.

In addition, in actual operation the processing unit 15 may confirm whether the selected window of interest 130 is suitable at proper time points. For example, the processing unit 15 may calculate the image feature of the selected window of interest 130 at every predetermined time interval and select one new window of interest 130 having a maximum image feature or at least one new window of interest 130 when the image feature of the selected window of interest 130 is smaller than a predetermined value; or, the processing unit 15 may directly select one new window of interest 130 having a maximum image feature or at least one new window of interest 130 at every predetermined time interval. In addition, the window of interest 130 may be selected every time the system is restarted or every time a sleep mode is ended, or it may be selected according to the instruction of a user.

As mentioned above, the conventional optical mouse is not able to tolerate the assembly error and may not be able to correctly receive reflected light from the work surface when it is operated on different work surfaces such that errors may occur in operation. Therefore, the present disclosure further provides a displacement detection device (FIGS. 3 and 5) that utilizes a larger image sensing matrix and selects a window of interest in the image sensing matrix. As the calculation is performed by using a part of pixel range having apparent image features, it is able to effectively tolerate the assembly error and applied to different work surfaces.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. A displacement detection device, comprising:
a light source configured to illuminate a work surface in a projection direction;
an image sensor comprising an image sensing matrix having a rectangular shape and configured to capture reflected light from the work surface and to successively output image frames; and
a processor configured to respectively select at least one window of interest in the image frames and to calculate a displacement of the displacement detection device according to the window of interest in two of the image frames,
wherein the at least one window of interest is a partial pixel range in each of the image frames, and remaining pixel ranges in the image frames outside the at least one window of interest are not used in calculating the displacement, and
wherein the at least one window of interest is selected corresponding to a first position of the image sensing matrix according to reflected light from a first work surface and the at least one window of interest is selected corresponding to a second position of the image sensing matrix according to reflected light from a second work surface, and the first position is changed to the second position along a length direction of the image sensing matrix when the first work surface is changed to the second work surface, wherein the first position is different from the second position, and the first work surface is different from the second work surface.

2. The displacement detection device as claimed in claim 1, wherein the partial pixel range of the image frames has an image feature exceeding a predetermined value.

3. The displacement detection device as claimed in claim 2, wherein the image feature is an image quality or an image intensity.

4. The displacement detection device as claimed in claim 2, wherein when the image feature of each of the image frames is smaller than the predetermined value, the image sensor is further configured to attenuate an analog image with a DC value and amplify the analog image attenuated by the DC value before outputting the image frames.

5. The displacement detection device as claimed in claim 1, wherein the length direction of the image sensing matrix extends along a direction of a horizontal component of the projection direction.

6. The displacement detection device as claimed in claim 1, wherein the processor is further configured to compare a consistency of the displacement calculated according to different windows of interest selected within a same image frame among the image frames.

7. A displacement detection device, comprising:
a light source configured to illuminate a work surface in a projection direction;
an image sensing matrix comprising an image sensing matrix having a rectangular shape and configured to capture reflected light from the work surface and to output a first analog image;
an adding unit configured to attenuate the first analog image with a DC value and to output a second analog image;
an analog-to-digital unit configured to amplify the second analog image and to output a digital image frame; and
a processor configured to select at least one window of interest in the digital image frame and to calculate a displacement of the displacement detection device according to the window of interest,
wherein the at least one window of interest is a partial pixel range in every digital image frame outputted by the analog-to-digital unit, and a remaining pixel range in the digital image frame outside the at least one window of interest is not used in calculating the displacement, and
wherein the at least one window of interest is selected corresponding to a first position of the image sensing matrix according to reflected light from a first work surface and the at least one window of interest is selected corresponding to a second position of the image sensing matrix according to reflected light from a second work surface, and the first position is changed to the second position along a length direction of the image sensing matrix when the first work surface is changed to the second work surface, wherein the first position is different from the second position, and the first work surface is different from the second work surface.

8. The displacement detection device as claimed in claim 7, wherein the DC value is an average intensity or an intensity offset of the second analog image.

9. The displacement detection device as claimed in claim 7, wherein the partial pixel range of the digital image frame has an image feature exceeding a predetermined value.

10. The displacement detection device as claimed in claim 9, wherein the image feature is an image quality or an image intensity.

11. The displacement detection device as claimed in claim 7, wherein the length direction of the image sensing matrix extends along a direction of a horizontal component of the projection direction.

12. The displacement detection device as claimed in claim 7, wherein the image sensing matrix has a size larger than 32×128.

13. The displacement detection device as claimed in claim 7, wherein the processor is further configured to compare a consistency of the displacement calculated according to different windows of interest selected within the same image frame.

14. A displacement detection device, comprising:
a light source configured to illuminate a work surface in a projection direction;
an image sensor comprising an image sensing matrix having a rectangular shape and configured to capture reflected light from the work surface and to output an image frame; and
a processor configured to select a window of interest having an image feature maximum in the image frame and to calculate a displacement of the displacement detection device according to the window of interest,
wherein the window of interest is a partial pixel range in every image frame outputted by the image sensor, and a remaining pixel range in the image frame outside the window of interest is not used in calculating the displacement, and
wherein the window of interest is selected corresponding to a first position of the image sensing matrix according to reflected light from a first work surface and the window of interest is selected corresponding to a second position of the image sensing matrix according to reflected light from a second work surface and the first position is changed to the second position along a length direction of the image sensing matrix when the first work surface is changed to the second work surface, wherein the first position is different from the second position, and the first work surface is different from the second work surface.

15. The displacement detection device as claimed in claim 14, wherein the image feature is an image quality or an image intensity.

16. The displacement detection device as claimed in claim 14, wherein the length direction of the image sensing matrix extends along a direction of a horizontal component of the projection direction.

17. The displacement detection device as claimed in claim 14, wherein the processor is configured to calculate the image feature of the window of interest at every predetermined time interval.

18. The displacement detection device as claimed in claim 17, wherein when the image feature of the window of interest is smaller than a predetermined value, the processor is configured to select a new window of interest having a maximum image feature.

19. The displacement detection device as claimed in claim 14, wherein the processor is configured to select a new window of interest having a maximum image feature at every predetermined time interval.

20. The displacement detection device as claimed in claim 14, wherein when the image feature of the image frame is smaller than a predetermined value, the image sensor is further configured to attenuate an analog image with a DC value and amplify the analog image attenuated by the DC value before outputting the image frame.

* * * * *